United States Patent [19]

Watanabe

[11] Patent Number: 5,598,215
[45] Date of Patent: Jan. 28, 1997

[54] MOVING IMAGE ENCODER AND DECODER USING CONTOUR EXTRACTION

[75] Inventor: Hiroshi Watanabe, Kamakura, Japan

[73] Assignee: Nippon Telegraph and Telephone Corporation, Tokyo, Japan

[21] Appl. No.: 247,975

[22] Filed: May 23, 1994

[30] Foreign Application Priority Data

May 21, 1993 [JP] Japan .................................. 5-120218

[51] Int. Cl.$^6$ ................................................. H04N 7/32
[52] U.S. Cl. .......................................... 348/416; 382/242
[58] Field of Search ...................... 348/416, 402, 348/401, 400, 415, 409, 699, 700, 390, 384; 382/242, 238, 236, 232

[56] References Cited

U.S. PATENT DOCUMENTS

| | | | |
|---|---|---|---|
| 3,716,667 | 2/1973 | Connor et al. | 178/6 |
| 5,103,488 | 4/1992 | Gemello et al. | 382/22 |
| 5,113,255 | 5/1992 | Nagata et al. | 358/136 |
| 5,214,504 | 5/1993 | Toriv et al. | 358/105 |
| 5,228,028 | 7/1993 | Cucchi et al. | 370/94.1 |
| 5,262,854 | 11/1993 | Ng | 358/133 |
| 5,301,032 | 4/1994 | Hong et al. | 358/261.2 |
| 5,311,310 | 5/1994 | Jozawa et al. | 348/416 |
| 5,351,083 | 9/1994 | Tsukagoshi | 348/384 |
| 5,376,971 | 12/1994 | Kadono et al. | 348/699 |

FOREIGN PATENT DOCUMENTS

0476603A2  3/1992  European Pat. Off. .

OTHER PUBLICATIONS

"Region–Oriented Coding of Moving Video–Compatible Quality Improvement by Object–Mask Generation", Signal Processing v. Theories and Applications, Elsevier Scient Publishers B.V., 1990, pp. 777–780. Sep. 1990.

"Region–Oriented Coding of Moving Video–Motion Compensation by Segment Matching", Signal Processing v. Theories and Applications, Elsevier Science Publishers B.V., 1990, pp. 765–768. Sep. 1990.

"Object Oriented Analysis–Synthesis Coding of Moving Images", Signal Processing: Image Communication 1 (1989) pp. 117–138. May 1989.

"An efficient technique to cancel isolated regions of the three level maps within post–segmentation processing", 1990 Picture Coding Symposium Proceedings, Mar. 1993, pp. 14.4 A–B.

"Motion video coding: An universal coding approach", Image Processing Algorithms and Techniques, SPIE, Feb. 1990, pp. 389–405.

"Digitale Bilcodierung", Fernseh Und Kino Technik, vol. 47, No. 1, Jan. 1993, pp. 33–42.

*Primary Examiner*—Tommy P. Chin
*Assistant Examiner*—Bryan S. Tung
*Attorney, Agent, or Firm*—Finnegan, Henderson, Farabow, Garrett & Dunner, L.L.P.

[57] ABSTRACT

A moving image transmission method encodes and decodes information to obtain a high transmission efficiency. The coding method calculates motion parameters of each segment of an image and segment prediction is conducted between frames. The encoder of the sending end and the decoder of the receiving end independently determine each respective segment for n frames (n is a natural number) in which encoding has been completed. To predict the corresponding portion of the present frame, the encoder calculates the required motion parameters, and then sends these motion parameters with the coded information to the decoder. In the decoder, prediction between frames is performed using the segment information independently determined with regard to the image of the previous frame in addition to the coded information and motion parameters received from the encoder.

10 Claims, 14 Drawing Sheets

N-1 FRAME   N FRAME

MOVING IMAGE ENCODER AND DECODER USING CONTOUR EXTRACTION

BACKGROUND OF THE INVENTION

The present invention relates to a moving image encoder and decoder for performing encoding and transmission of a moving image in a more efficient manner.

RELEVANT ART

A regional based coding method is known for dividing an image into regions by means of conducting an edge detection process on the image or a process in which portions of uniform motion are integrated; forming motion parameters which indicate how each of the aforementioned regions is modified with respect to the original image; and transmitting the coded motion parameters ("Object-Oriented Analysis-Synthesis Coding of Moving Images", H. G. Husmann, et al., pp. 117–138, Signal Processing, Elsvier Science Publishers B.V., 1989). According to conventional methods, in addition to obtaining motion information in the aforementioned manner, the contour information of each region is coded at each time period and then transmitted to the decoder. FIG. 8 is a block diagram showing a construction of a conventional moving image encoder for encoding and transmitting motion parameters and contour information. As shown in FIG. 8, this moving image encoder comprises a differentiator 1, discrete cosine transform 2, quantizer 3, inverse quantizer 4, inverse discrete cosine transform 5, adder 6, frame memory 7, motion compensation 8, contour extractor 9, and motion parameter extractor 10.

In the aforementioned structure, the input image $I_n$ to be coded and transmitted is initially inputted into differentiator 1. The difference between input image In and prediction image $P_n$ is calculated by means of this differentiator 1, and a differential image $\Delta_n$ is subsequently outputted. Prediction image $P_n$ will be mentioned hereafter. Subsequently, with regard to this differential image $\Delta_n$, direct transforms such as discrete cosine transform is conducted by means of discrete cosine transform 2 and the resultant transform coefficient $C_n$ is then outputted. This transform coefficient $C_n$ is quantized by means of quantizer 3 and then sent to the receiving set as coded information $D_n$. This coded information $D_n$ is sent to both the receiving set, and inverse quantizer 4 where it is quantized. Inverse discrete cosine transform is conducted on this inverse quantized information by means of an inverse discrete cosine transform 5, and quantization differential signal $Q\Delta_n$ is then outputted. Between a quantized differential image $Q\Delta_n$ and differential image $\Delta_n$, a difference equivalent to the quantized error generated during the quantization of quantizer 3 exists. The quantized differential image $Q\Delta_n$ is then added to the prediction image $P_n$ by means of adder 6. The result of this addition, i.e., the sum of quantized differential image $Q\Delta_n$ and prediction image $P_n$ corresponding to the coded image $D_n$ sent to the receiver—the image information which is actually sent to the receiver (hereinafter referred to as "local decoded image")—is then obtained. The image information obtained from this adder 6 is then recorded in frame memory 7 as a local decoded image.

On the other hand, the moving vector ($V_x$, $V_y$) is detected by means of a moving vector detector 100 using a detection method such as a block-matching method or the like, and this moving vector and an input image $I_n$ are then inputted into a contour extractor 9. By means of this contour extractor 9, portions possessing similar motions in input image $I_n$ are extracted together based on the edge information incorporated into this input image $I_n$ and the motion vectors ($V_x$, $V_y$). The input image $I_n$ is then divided (segmented) into a plurality of segments each formed from portions possessing similar motions. In this manner, the contour information $S_n$ indicating the contours of each segment is extracted by means of contour extractor 9; this contour information $S_n$ is transmitted to the receiving set and also sent to motion compensation 8 and motion parameter extractor 10.

In motion parameter extractor 10, with regard to the motion vector of a segment within contour $S_n$, the optimum affine transform parameters a, . . . , f signifying the mean square root error is calculated for each segment, and then transmitted to both the receiving end and motion compensation 8. Motion compensation 8 reads out the local decoded image $Ic_{n-1}$ corresponding to the frame in which transmission has been completed; activates the affine transform parameters corresponding to this aforementioned segment as a set of motion parameters with regard to each pixel within each segment designated by the contour information $S_n$ in this local decoded image $Ic_{n-1}$; and then calculates the prediction pixel value of the pixels within each segment.

The aforementioned motion vector is calculated by searching for the affine transform $A_1$ which minimizes the evaluation function $J_1$ obtained as shown below.

$$J_1 = g[I(N,i,j) - Ic(N-1, A_1[i,j])]$$

wherein, g: evaluation function ($L_1$, $L_2$, etc.);

$Ic(N-1, A_1[ij])$: pixel value of $A_1[ij]$ of the coded image at time point N–1;

$I(N,i,j)$: pixel value of coordinate (i,j) belonging to region R of an input image at time point N;

$A_1$ represents the transform from I to Ic of region Rc.

It is possible to evaluate the same procedure using the inverse transform of $A_1$ as shown below. Similarly, the motion vector is calculated by searching for the affine transform $A_1^{inv}$ which minimizes the evaluation function $J_1^{inv}$.

$$J_1^{inv} = g[I(N, A_1^{inv}[i,j]) - Ic(N-1,i,j)]$$

wherein, g: evaluation function;

$Ic(N-1,i,j)$: pixel value of coordinate (i,j) of the coded image at time point N–1;

$I(N,A_1^{inv}[i,j])$: pixel value of coordinate $A_1^{inv}[i,j]$ belonging to region R of an input image at time point N;

$A_1^{inv}$ represents the affine transform from I to Ic of region Rc.

FIG. 10 is a general diagram showing a regional prediction according to a conventional image transmission method. According to this method, the region to be predicted in the anticipated image (N frame) is initially determined, and the contour information of the portions exhibiting similar motions is then concretely determined. Subsequently, the region of the previous image (N–1 frame) to be used in order to predict the aforementioned region (to be predicted) is determined.

FIG. 9 is a block diagram showing a construction of a moving image decoder which is used together with a conventional moving image encoder. Decoder 90 comprises inverse quantizer 91, inverse discrete cosine transform 92, adder 93, flame memory 94, contour reproducing portion 95, and motion compensation 96. In the conventional moving image transmission process, coded information $D_n$ is added to the motion parameters a, . . . , f, and the contour information $S_n$ is then transmitted to the receiving set. The reason for this type of procedure is explained in the following.

Initially, as shown in FIG. 9, in the receiving set, the local decoded image is restored by means of performing inverse quantization and inverse discrete cosine transform of the coded information $D_n$; the input image $I_n$ at the sending end is then restored by adding the prediction image generated at the receiving end to the aforementioned local decoded image. This restoration of the prediction image is performed by means of activating each motion parameters a, . . . , f received from the sending set with regard to the local decoded image, as shown in FIG. 10. However, since each of the aforementioned sets of motion parameters is defined for each segment into which various input images $I_n$ are divided, information relating to each set of motion parameters, as well as the segments in which these parameters are supposed to be activated is unnecessary in the above restoration of the prediction image. Conventionally, in the sending set, the calculated contour information $S_n$ is coded using chain characters, polygonal approximations, etc., and then transmitted to the receiving set. At the receiving set, based on this contour information $S_n$, the local decoded image is divided into a plurality of segments, and the motion parameters corresponding to the various segments are activated to obtain the prediction image.

The procedural flow of the moving image encoder and moving image decoder in the conventional image transmission process is illustrated by the flowcharts shown in FIGS. 11(A) and 11(B). In the moving image encoder (FIG. 11A) based on both the present image and the previous image, the motion parameters, contour information, and differential information are extracted and transmitted to the decoder. In addition, the reconstructed image is formed in the decoder (FIG. 11B) based on the aforementioned information sent from the encoder.

FIG. 13 is a general diagram showing a visual illustration of the procedural flow based on the conventional method. At the sending end, upon receipt of the image information (300) to be sent (input image $I_n$), the image is divided into segments by means of an edge detection process or the like, and the contour data of the segments is then sent to the receiving end (301). Subsequently, at the sending end, motion parameters are extracted (302) based on the input image $I_n$ and local decoded image $Ic_{n-1}$, and then sent to the receiving end. Furthermore, at the sending end, the original activated area of local decoded image $Ic_{n-1}$ to activate the motion parameters is calculated (303), the motion parameters are activated (304), and the prediction image $P_n$ is formed (305). Lastly, the difference between the input image $I_n$ and prediction image $P_n$ is obtained and sent to the receiving end.

In the receiving end, the original activated area is calculated based on the contour data and motion parameters received (307). The motion parameters received with respect to the recorded original activated area of decoded image $I_{n-1}$ are then activated (308), and prediction image $P_n$ is formed (309). This prediction image $P_n$ is formed based on the same information as used in the sending set, thus this prediction image $P_n$ is identical to the prediction image $P_n$ obtained in the sending set. The input image In is then reproduced by performing inverse quantization of the encoded information received and then adding this result to the prediction image $P_n$ (310).

However, when processing in this manner, there exists a problem in that in the case when contour information $S_n$ is incorporated into the information sent from the sending set to the receiving set, the entire amount of information sent becomes significantly large. In addition, the shape of the segments becomes complex, and moreover, in the case when a large number of segments exists, the amount of information to be sent further increases, thereby causing problems such as the reduction of the transmission efficiency.

SUMMARY OF THE INVENTION

In consideration of the aforementioned, it is an objective of the present invention to provide a moving image transmission method wherein the amount of information to be transmitted can be reduced such that a high transmission efficiency can be obtained. In order to achieve this objective, the present invention provides an image coding method in which the motion parameters of each segment are calculated and prediction is conducted in between frames. In this method, the encoder of the sending end and the decoder of the receiving end independently determine each respective segment with regard to the images of an n number of frames (n is a natural number) in which encoding has been completed. In order to predict the corresponding portion of the present frame from a segment calculated from the image of the previous frame, the encoder calculates the required motion parameters, and then sends these motion parameters with the coded information to the decoder. In the decoder, prediction between frames is performed using the segment information independently determined with regard to the image of the previous frame in addition to the coded information and motion parameters received from the encoder.

According to the moving image transmission method of the present invention, since the local decoded image which has undergone decoding is divided into segments at both the sending and receiving ends according to the same regional segmenting procedure, it is not necessary to transmit the contour information. Consequently, since the information to be transmitted comprises only the coded information and the motion parameters, the amount of information to be transmitted can be significantly reduced. When using a plurality of coded frames in which encoding has been completed, prediction in between frames is conducted at each segment by referencing an M number of frames from among an N number of frames in which encoding has been completed (M<N, or M=N).

Furthermore, according to an embodiment of the present invention, in the case when null portion are generated in the present frame which was predicted according to the aforementioned method, in other words, when the prediction involves a region which does not exist, or when a region Which cannot be predicted from the previous frame image is generated, a predetermined interpolation procedure is executed. Furthermore, according to another embodiment of the present invention, a predetermined overlap process is executed when overlap exists with regard to the present frame predicted by means of the aforementioned method.

Hence, according to the embodiments of the present invention, by means of executing the aforementioned interpolation and overlap procedures, rapid image reproduction can be accomplished with regard to an unpredicted region and/or a region in which prediction overlap exists.

DETAILED DESCRIPTION OF THE PREFERRED EMBODIMENTS

Figure 1:
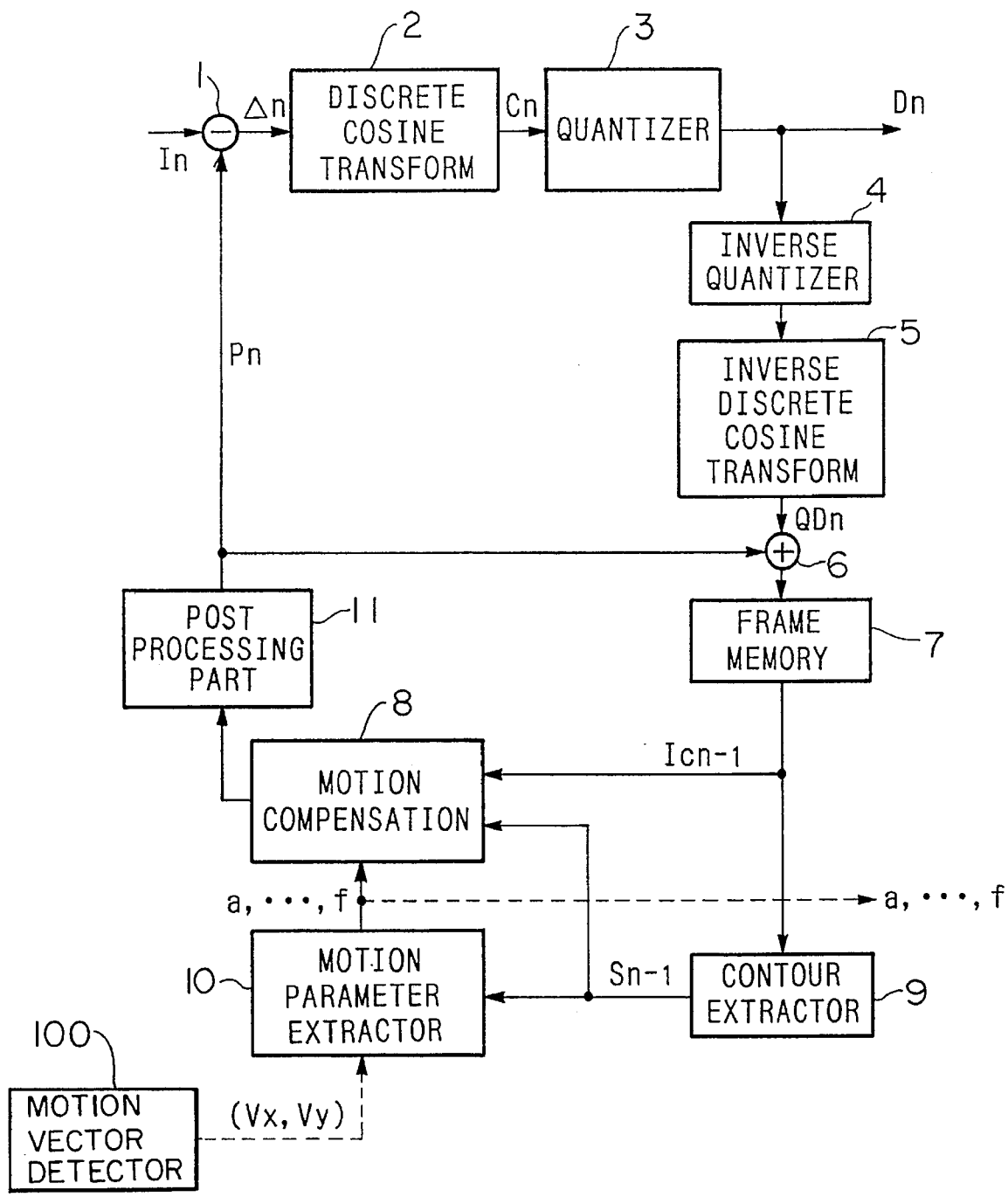
FIG. 1 is a block diagram showing a construction of a encoder for conducting a moving image transmission method according to an embodiment of the present invention.

In the following, the preferred embodiments of the present invention with reference to the figures. FIG. 1 is a block diagram showing a construction of a encoder for conducting a moving image transmission method according to an embodiment of the present invention. Furthermore, in this figure, structures corresponding to those shown in the aforementioned FIG. 8 are denoted by the same numerals.

Figure 8:
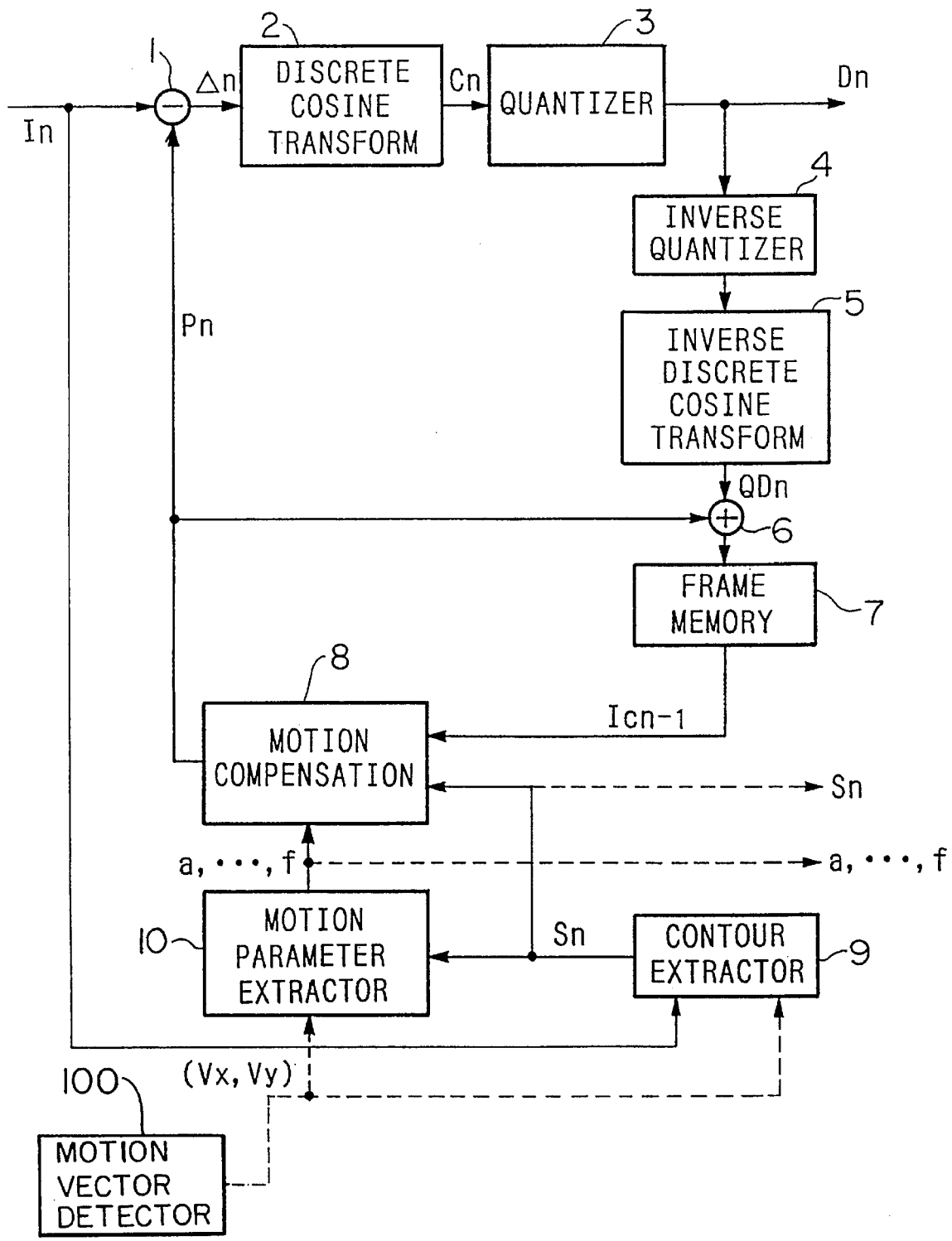
FIG. 8 is a block diagram showing a construction of a encoder according to a conventional segment coding transmission using motion compensation.
Figure 9:
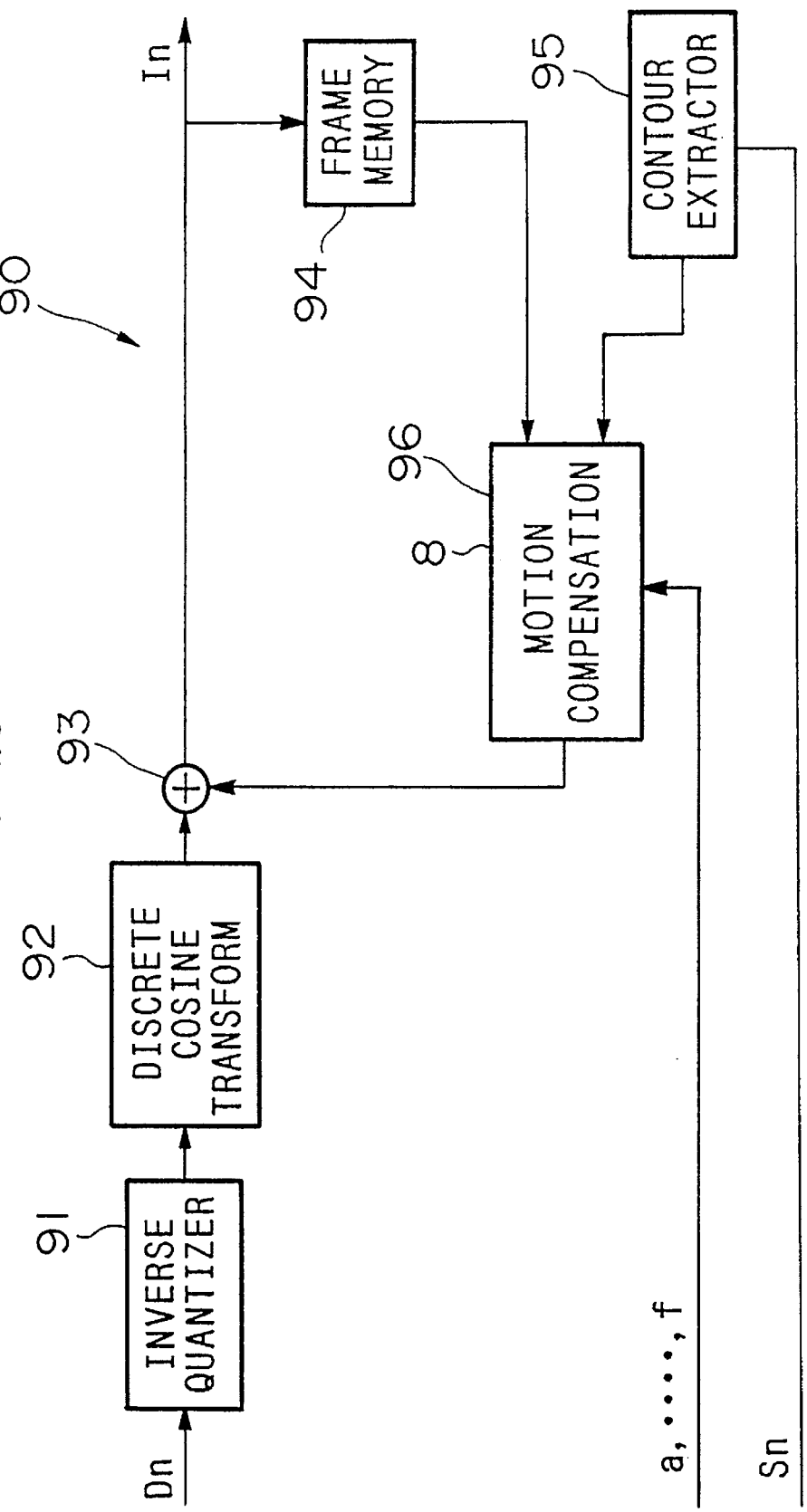
FIG. 9 is a block diagram showing a construction of a decoder according to a conventional segment coding transmission using motion compensation.

In the apparatus shown in FIG. 8, contour extractor 9 conducts division of an input image $I_n$ into a plurality of segments and extracts contour information $S_n$. In contrast, contour extractor 9 of the present embodiment performs regional division of the image to be used in prediction. In other words, this contour extractor 9 according to the present embodiment initially conducts edge detection of a local decoded image $Ic_{n-1}$ of a frame in which transmission has been completed and read out from frame memory 7 based on a brightness or color differential signal, and then performs division of this image into segments and extraction of the contour information $S_{n-1}$.

According to the present invention, based on the region of the previous image which has already been coded and stored in frame memory, the transform process at the time of predicting the portion corresponding to the prediction image is expressed by means of motion parameters.

The motion vector is calculated as shown below, by searching for the affine transform $A_2$ which minimizes the evaluation function $J_2$.

$$J_2 = g[I(N, A_2[i,j]) - Ic(N-1, i, j)]$$

wherein, g: evaluation function ($L_n$ norm, etc.);

Ic(N−1,i,j): pixel value of coordinate (i,j) belonging to region Rc of the coded image at time point N−1;

I(N,$A_2$[i,j]): pixel value of the input image at time point N;

$A_2$ represents a transform from Ic to I of region Rc.

It is possible to evaluate this same procedure using the inverse transform of $A_2$. At this time, the motion vector can be calculated by searching for the affine transform $A_2^{inv}$ which minimizes the evaluation function $J_2^{inv}$, as shown below.

$$J_2^{inv} = g[I(N,i,j) - Ic(N-1, A_2^{inv}[i,j])]$$

wherein, g: evaluation norm ($L_1$, $L_2$, etc.);

Ic(N−1,$A_2^{inv}$[i,j]): pixel value of coordinate $A_2^{inv}$[i,j] belonging to region Rc in the coded image at time point N−1;

I(N,i,j): pixel value of the input image at time point N;

$A_2^{inv}$ represents an affine transform from I to Ic of region Rc.

Figure 3:
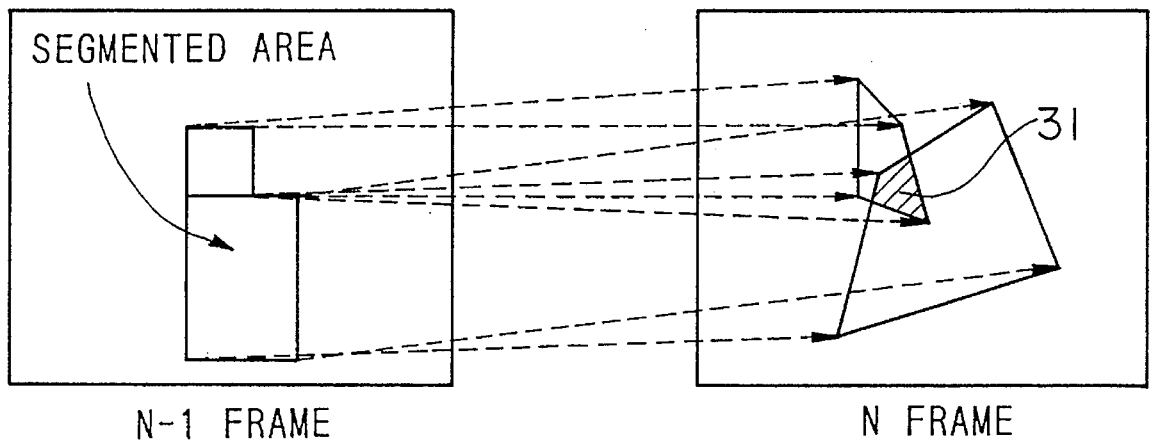
FIG. 3 is a general diagram showing image prediction according to the present invention.

FIG. 3 is a general diagram showing regional prediction according to the moving image transmission method of the present invention. According to the present invention, initially, a region is determined in the previous image (N−1 frame). Subsequently, the region of the prediction image (N frame) corresponding to this aforementioned region is determined.

In addition, motion parameter extractor 10 shown in FIG. 1 is similar to the structure shown in the aforementioned FIG. 8; this motion parameter extractor 10 calculates the optimum motion parameters which will minimize the mean square root error with regard to a motion vector of a region within contour $S_n$−1. With regard to the motion parameters, various processes can be used; however, a representative process is one in which six parameters are used based on the affine transform. The motion vector is calculated by means of performing a block-matching method or the like for each pixel; upon calculating the motion vector, the six parameters are determined by means of a minimum square root approximation method. It is possible to describe this motion amount by means of the amount of displacement, the amount of rotation, and the longitudinal strain. The horizontal · vertical motion vector (Vx(x,y), Vy(x,y)) at point (x,y) can be approximated using affine parameters a, . . . , f in the following manner.

$$\begin{pmatrix} Vx(x,y) \\ Vy(x,y) \end{pmatrix} = \begin{pmatrix} a & b \\ d & e \end{pmatrix} \begin{pmatrix} x \\ y \end{pmatrix} + \begin{pmatrix} c \\ f \end{pmatrix}$$

At this point, the affine transform parameters may be calculated by obtaining the motion vector (Vx, Vy) of each pixel. However, it is also possible to obtain the motion vector between the two regions without calculating Vx and Vy from the relationship between the pixel values of the two regions.

In the present embodiment, the case of a two-dimensional affine transform is described; however, it is also possible to use a process in which the three-dimensional affine transform is calculated and projected onto a two-dimensional plane. Motion compensation 8 divides local decoded image $Ic_{n-1}$ according to contour information $S_n-1$, in other words, according to the contour information used in order to obtain each segment in which extraction of the motion parameters from local decoded image $Ic_{n-1}$ is performed. Each set of motion parameters supplied from the motion parameter extractor 10 of each segment obtained by the aforementioned division is activated to form the prediction image $P_n$.

In the aforementioned, an explanation was provided with regard to a method for forming the prediction image using only the previous frame; however, in the case when delays are allowable, and/or in the case when decoding is performed after accumulation of the coded data, in point of time, even a future frame can be used in the formation of a prediction image so long as the coding process has been completed.

Generally, the prediction image is formed using a plurality of frames in which encoding has been completed. When coding is attempted on a frame at time point N, the segment of the present frame can be predicted using the motion parameters from each of the frames at time point N−1 and time point N+1, as long as encoding has been completed in these frames. In addition, at this time, a process can be employed for selecting the use of either one of the predictions, or the arithmetic mean of both prediction pixels to form the prediction image. There are also cases in which two or more reference frames are used. Generally in the case when a plurality of frames in which encoding has been completed are used, prediction in between frames can be conducted by referencing an M number of frames from among an N number of frames in which encoding has been completed (M<N) at each segment.

For the sake of comparison, a conventional method for predicting a segment of N frame using a segment of N−1 frame will be explained in the following. In the conventional apparatus shown in FIG. 8, the segments in which extraction of each of the motion parameters is performed are determined by means of input image $I_n$.

Figure 10:
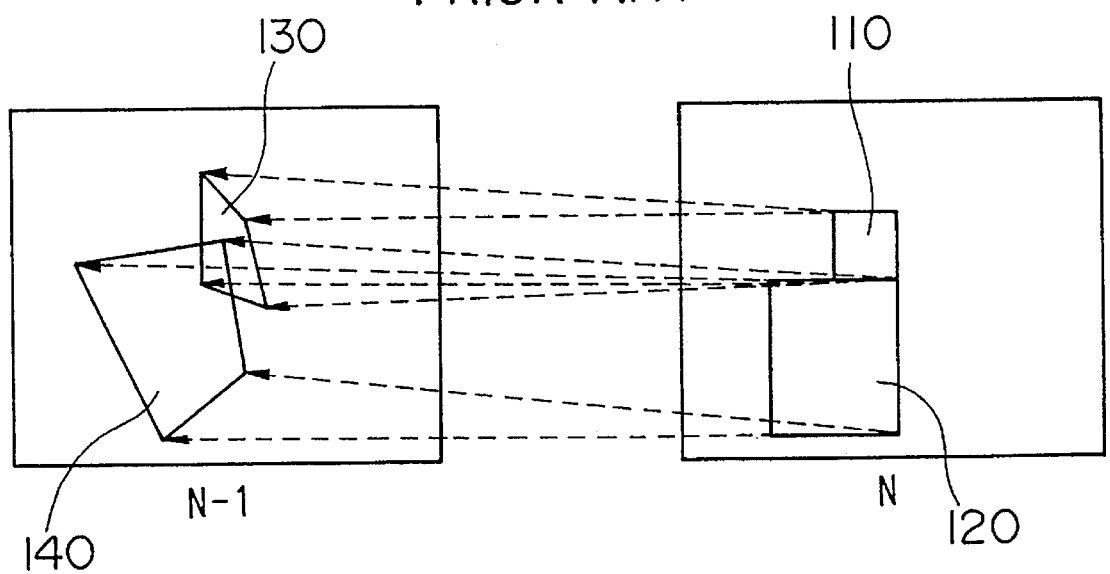
FIG. 10 is a general diagram showing image prediction according to a conventional method.
Figure 11A:
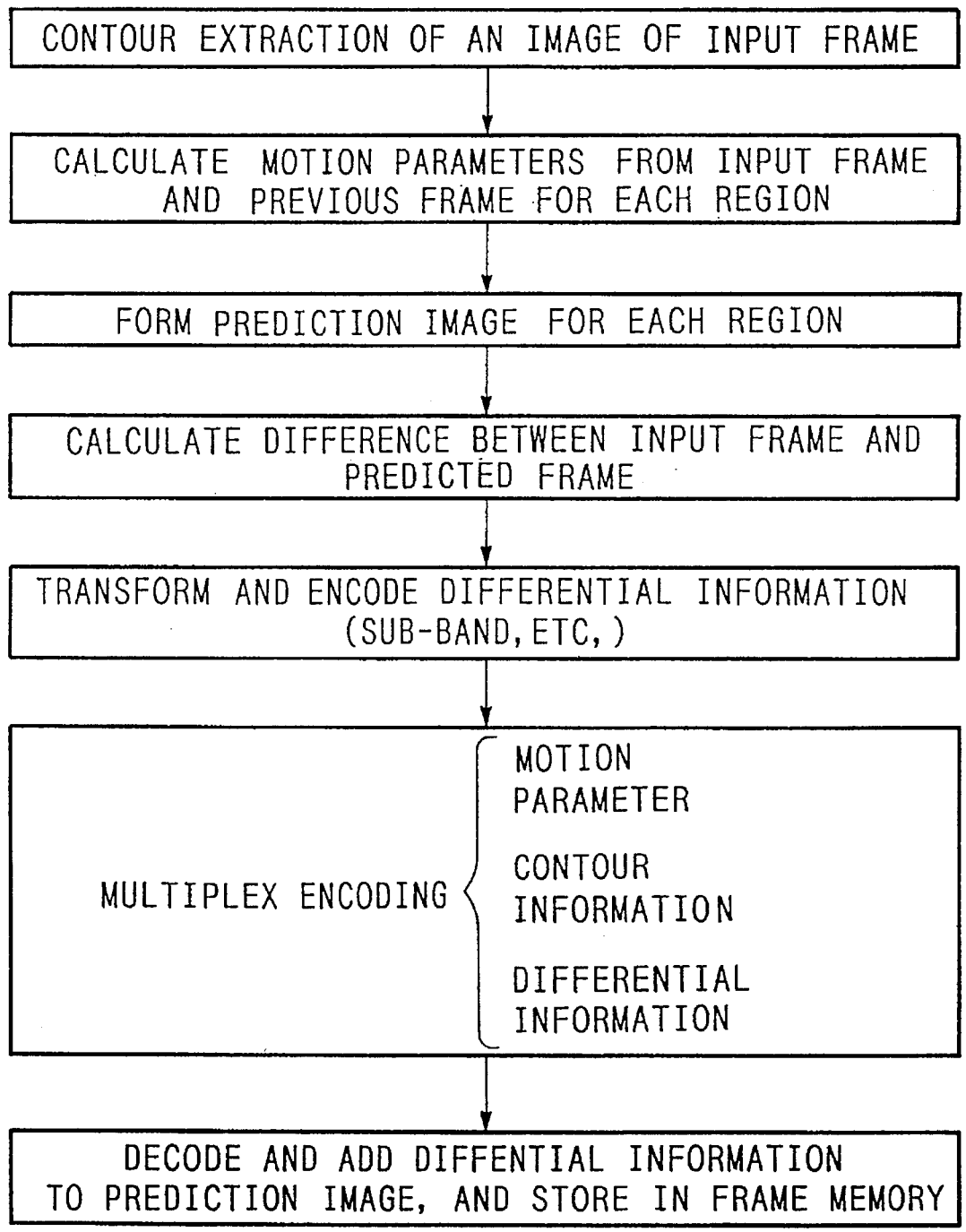
FIGS. 11(A) and 11(B) are flowcharts showing a moving image transmission method according to a conventional method.
Figure 11B:
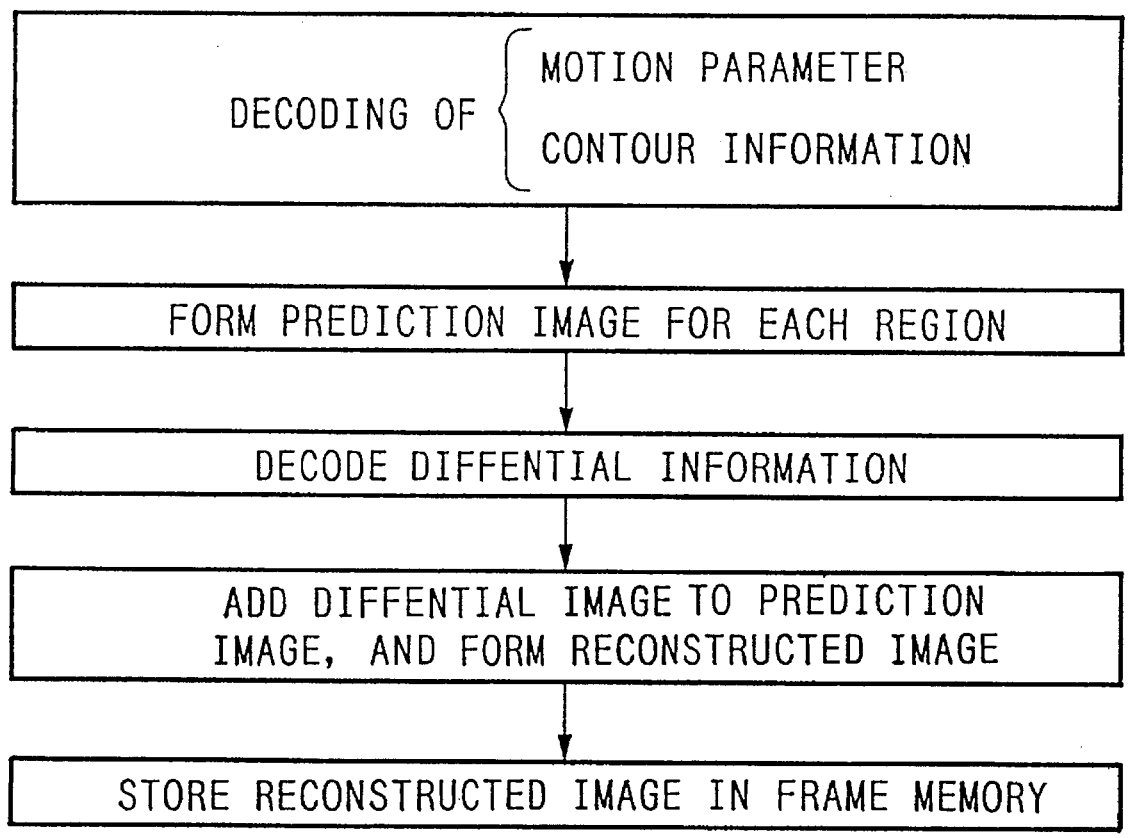

As shown in FIG. 10, the segments in input image $I_n$ are combined such that no overlap exists; however, in contrast, the segments of the corresponding local decoded image $Ic_{n-1}$ exhibit cases in which there is overlap. In FIG. 10, segments 130 and 140 of N−1 frame correspond to segments 110 and 120 of N−1 frame; however, overlapping portions exist within segment 130 and segment 140. In addition, in local decoded image $Ic_{n-1}$, there are also cases in which portions not used in the prediction of input image $I_n$ exist, and furthermore, there are cases in which segments which cannot be predicted from local decoded image $Ic_{n-1}$ exist in an input image $I_n$. According to the conventional method, the region of the image to be predicted is determined in the encoder; in order to predict this region, coding is carried out by means of motion parameters using pixels at a predetermined position of the previous image. As a result, when the division of the region of the image to be predicted is performed without overlap, unpredicted portions are not generated (however, as mentioned above, it is still possible for N−1 frame to lack information required for prediction).

In contrast, according to the method of the present invention, as shown in FIG. 3, instead of dividing the information of the previous image without excess or deficiency, there are cases in which a region of the present image, as seen from region 31, is predicted from two or more regions of the previous image. On the other hand, there also exist cases in which a region exists without a prediction value according to the prediction based on the previous image. The former case requires calculation of a mean or the like of the two overlapping prediction values, while the latter case requires an interpolation procedure. With regard to region 31 in which the prediction value is obtained from two or more regions of the previous image, it is possible to employ methods which utilize the mean value of the prediction values, as well as a process which first observes the direction of motion and then utilizes the prediction value indicating a motion differing from the motion vector of the previous time point.

Figure 4:
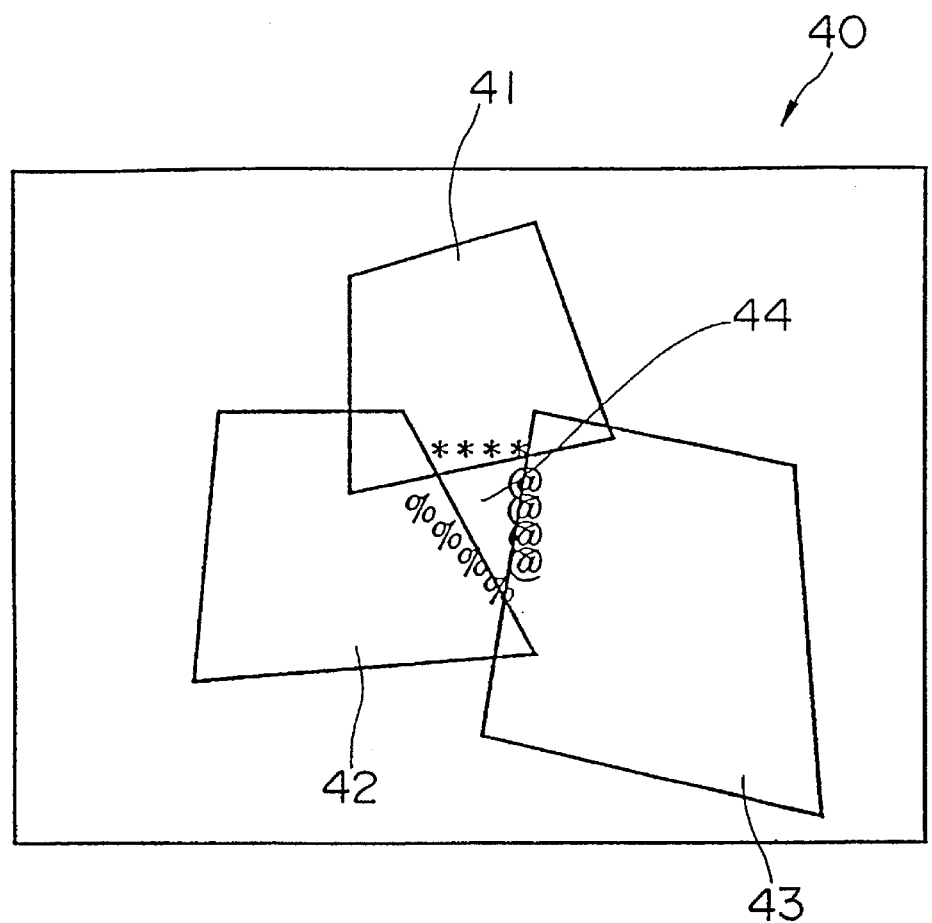
FIG. 4 is a general diagram showing an example of interpolation.

FIG. 4 is a general diagram showing the case in which an interpolation procedure is required. In the present image 40, three regions 41, 42, and 43, which are predicted from the previous image, exist; however, another region 44 which is surrounded by these three regions exists as a portion which is not predicted from any segments of the previous screen. With regard to this portion 44, since the prediction value cannot be obtained, it is necessary to predict the image information using another process, such as an interpolation process. As this interpolation process, a large number of processes can be considered such as a process which uses the mean value of the peripheral pixels of the prediction image as the prediction value of all pixels of the interpolation area; a process which uses the mean value of the pixels of the right and left peripheral portions of the interpolation area with regard to the horizontal direction; a process which uses the mean value of the pixels of the top and bottom peripheral portions of the interpolation area with regard to the vertical direction; a process which examines the motion direction of the right and left portions of the interpolation area, focuses on the region exhibiting motion in the direction towards the interpolation area, and utilizes the pixel value at the contact point with the interpolation area of this region; a process which focuses on the region exhibiting motion in the vertical direction, and utilizes the pixel value at the contact point with the interpolation area of this region; a process which focuses on the horizontal and vertical motions on the periphery of the interpolation area and utilizes the pixel value of the region exhibiting motion into the interpolation area; and a process for interpolating in pixel units using the motion vector which either interpolates or extrapolates surrounding motion vectors using pixel units.

Post processing part 11 in FIG. 1 performs correction of the prediction image according to the interpolation calculations. In other words, this post processing part 11 performs the interpolation calculation on the pixel values of each pixel comprising the prediction image, and then calculates the pixel value of the prediction image. In addition, in accordance with a predetermined priority order, the pixel value from the interpolation, or any pixel value of the prediction image is designated as the pixel value of the prediction image. In this manner, the prediction image $P_n$ to be supplied to the differentiator 1 is calculated. In the same manner as in the conventional apparatus, differentiator 1 outputs the difference between the input image $I_n$ and the prediction image $P_n$. However, when the difference between the input image and in the prediction image is extremely large, in other words, when the norm from using the prediction image is larger than the norm without using the prediction image, a judgment is rendered that use of the prediction image is inappropriate. The post processing part 11 then sets each pixel value of the prediction image of the corresponding region to "0", and differentiator 1 sends the input image in its original form to the discrete cosine transform 2. As in the aforementioned apparatus shown in FIG. 2, discrete cosine transform 2 and quantizer 3 transform the differential image Δn into coded information Dn and then transmit it to the receiving set. The actions of inverse quantizer 4, inverse discrete cosine transform 5, adder 6, and frame memory 7, provided as elements of a separate structure, are the same as in the apparatus shown in the above FIG. 2.

The decision whether or not to carry out the interpolation procedure is conducted according to the following procedure. Namely, the portion to undergo the interpolation process in the post processing part is a portion which cannot be predicted by modification of a certain portion of the image of the previous frame. In the case when there is no correlation between the pixels of the portion to be interpolated and the peripheral pixels, there is no improvement of the prediction efficiency even when prediction of the pixels of the present frame is performed using the interpolation pixels. This relationship can be expressed by the following formula.

$$a = f[I(i,j) - P(i,j)]$$

$$b = f[I(i,j)]$$

wherein, $I(i,j)$ represents the input image incorporated into region R from which the contour was obtained;

$P(i,j)$ represents the prediction image of region R obtained by means of interpolation processing;

$f[*]$ represents a random norm from among $L_1, L_2, \ldots, L_{(\infty)}$

A small norm as expressed by the aforementioned formula signifies a high prediction efficiency. Consequently, a and b are compared, and when a<b, the interpolation process is performed, while when a>b or a=b, it is not necessary to perform the interpolation process. Even if the prediction value is set to "0" without performing the interpolation process, a prediction error corresponds to the encoding of a pixel of a new portion within the same frame. In the case when the prediction is completely evaluated, encoding the new portion within the same frame represents the means for obtaining the highest coding efficiency. Consequently, even when the interpolation process is not performed, a constant result can be obtained for the coding efficiency.

In the aforementioned, a case was presented in which motion parmeters were used in the formation of the prediction image by means of segments, however, in addition to these motion parameters, the prediction image can be formed by means of brightness and/or contrast compensation. If the brightnesses of the segments are uniformly modified, the prediction image can be formed by correcting this value. In addition, when the contrast varies, the prediction image can be formed by adjusting this contrast. The order of performing these processes utilizing the aforementioned corrections or motion parameters, can be optionally designated.

In the present embodiment, the encoding information Dn and motion parameters are sent from the sending set to the receiving set, however, the contour information $S_n-1$ is not transmitted. In the receiving set, the input image is restored as described below based on the aforementioned coded information Dn and motion parameters.

Figure 2:
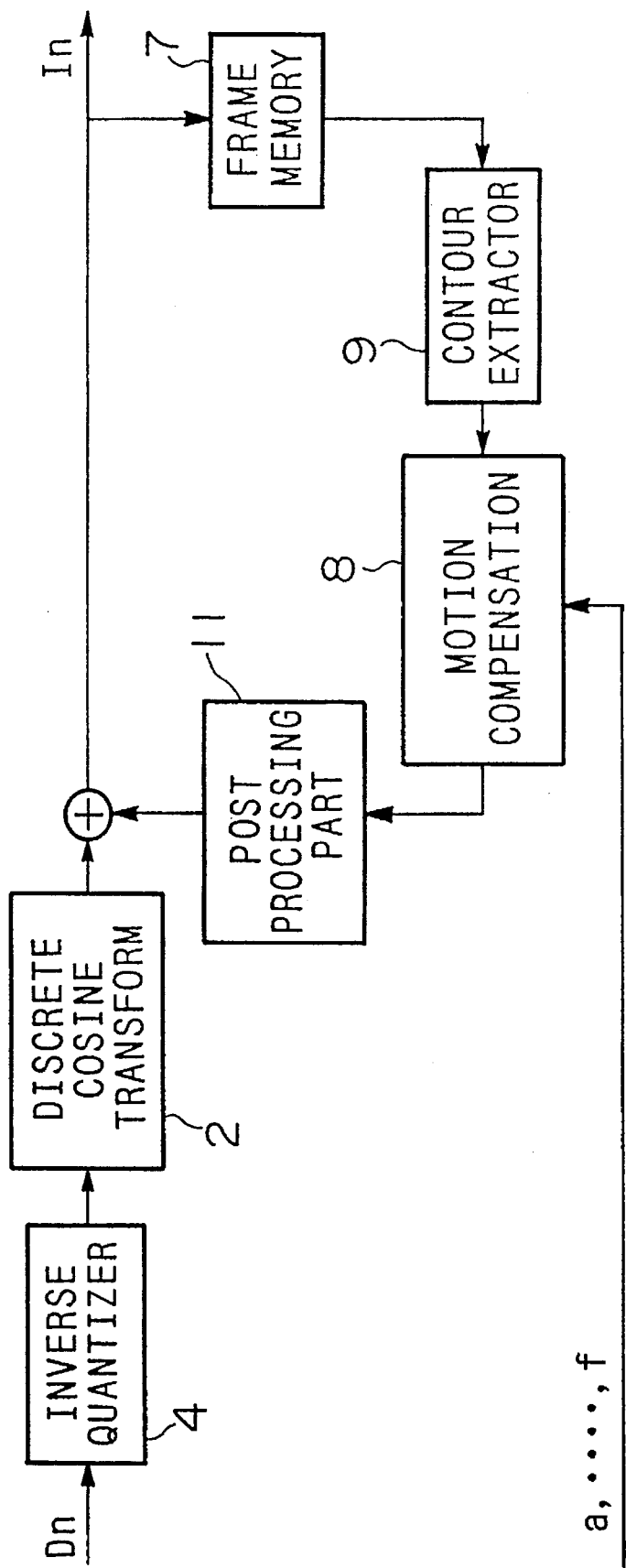
FIG. 2 is a block diagram showing a construction of a decoder for conducting a moving image transmission method according to an embodiment of the present invention.

As shown in FIG. 2, in the receiving set, inverse quantization is initially performed on the coded information Dn received from the sending set, and the result therein subsequently undergoes inverse discrete cosine transform. In this manner, the inverse transform of the transform carded out in the sending set to obtain the coded information Dn of the differential image Δn is performed in the receiving set in order to restore the image corresponding to the aforementioned differential image Δn. Subsequently, the prediction image of the receiving end at this time point is added to this differential image Δn, and the local decoded image at the receiving end, which is identical to the local decoded image formed in the sending set, is the restored. The local decoded image is then divided into a plurality of segments in which motion is uniform by means of the exact same process as performed in the sending set, and each of these segments is then modified by applying the motion parameters received. With regard to this result, correction of the prediction image is performed in an identical manner to the process performed in the post processing part of the sending set to form the prediction image of the receiving end.

In this manner, in the receiving set, a prediction image identical to that formed in the sending set is created by dividing the local decoded image and applying the motion parameters in the same manner as in the sending set without having to transmit or receive the contour information for each segment from the sending end.

Figure 5A:
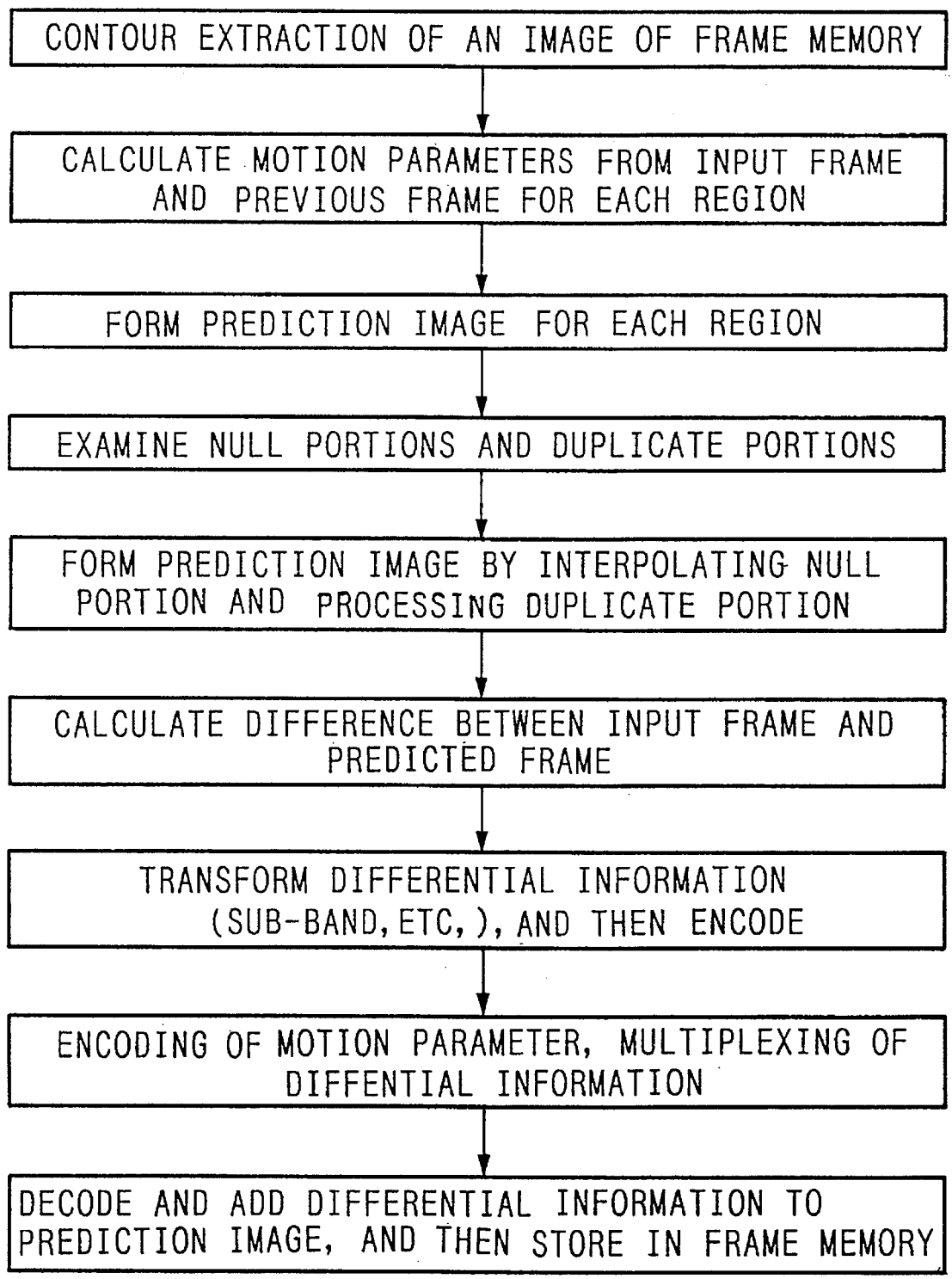
FIGS. 5(A) and 5(B) are flowcharts showing a moving image transmission method according to the present invention.
Figure 5B:
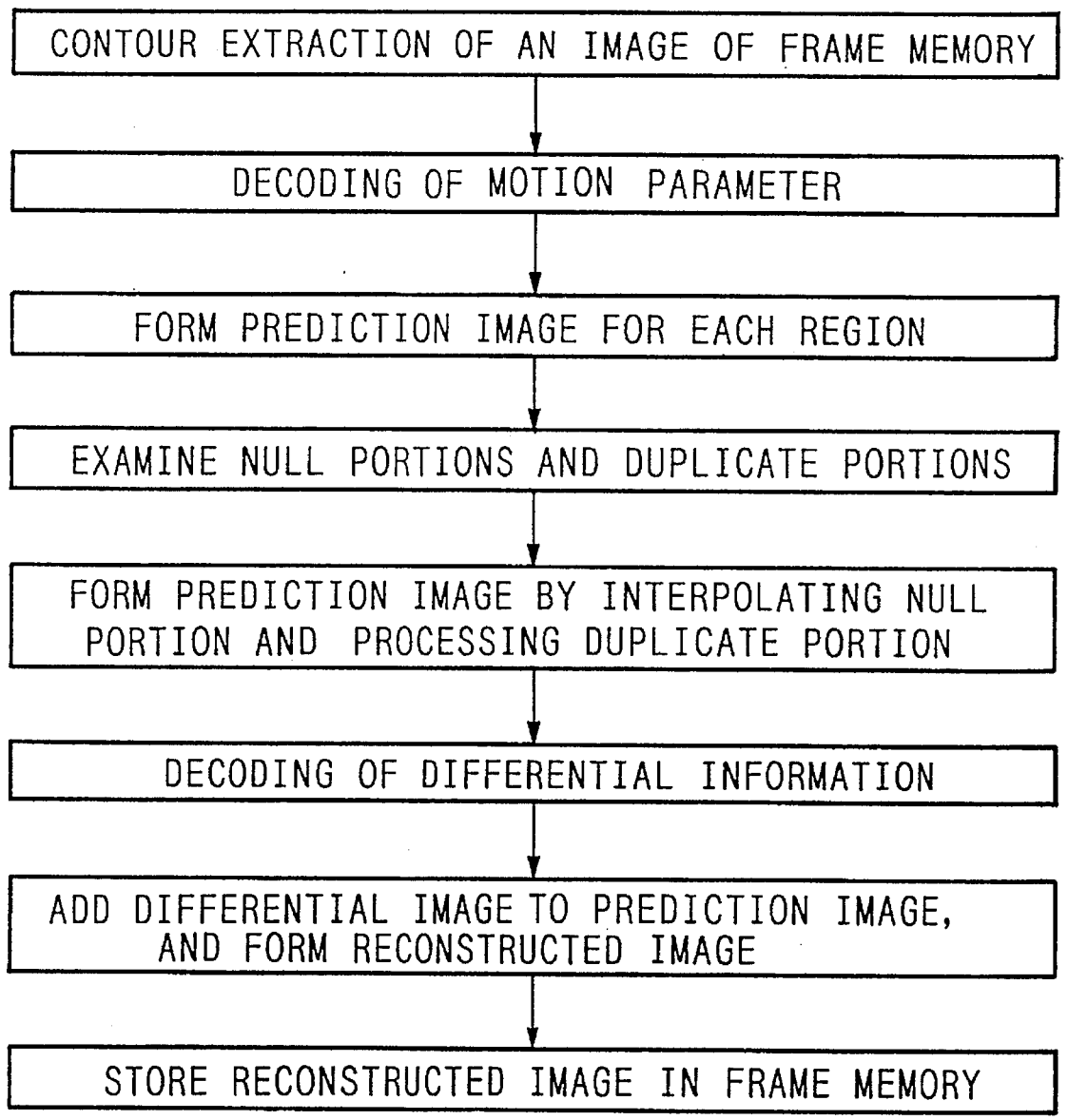

FIG. 5A is a flowchart showing the procedures of the encoder and FIG. 5B is a flowchart showing the procedures of the decoder according to the aforementioned embodiment.

Figure 12:
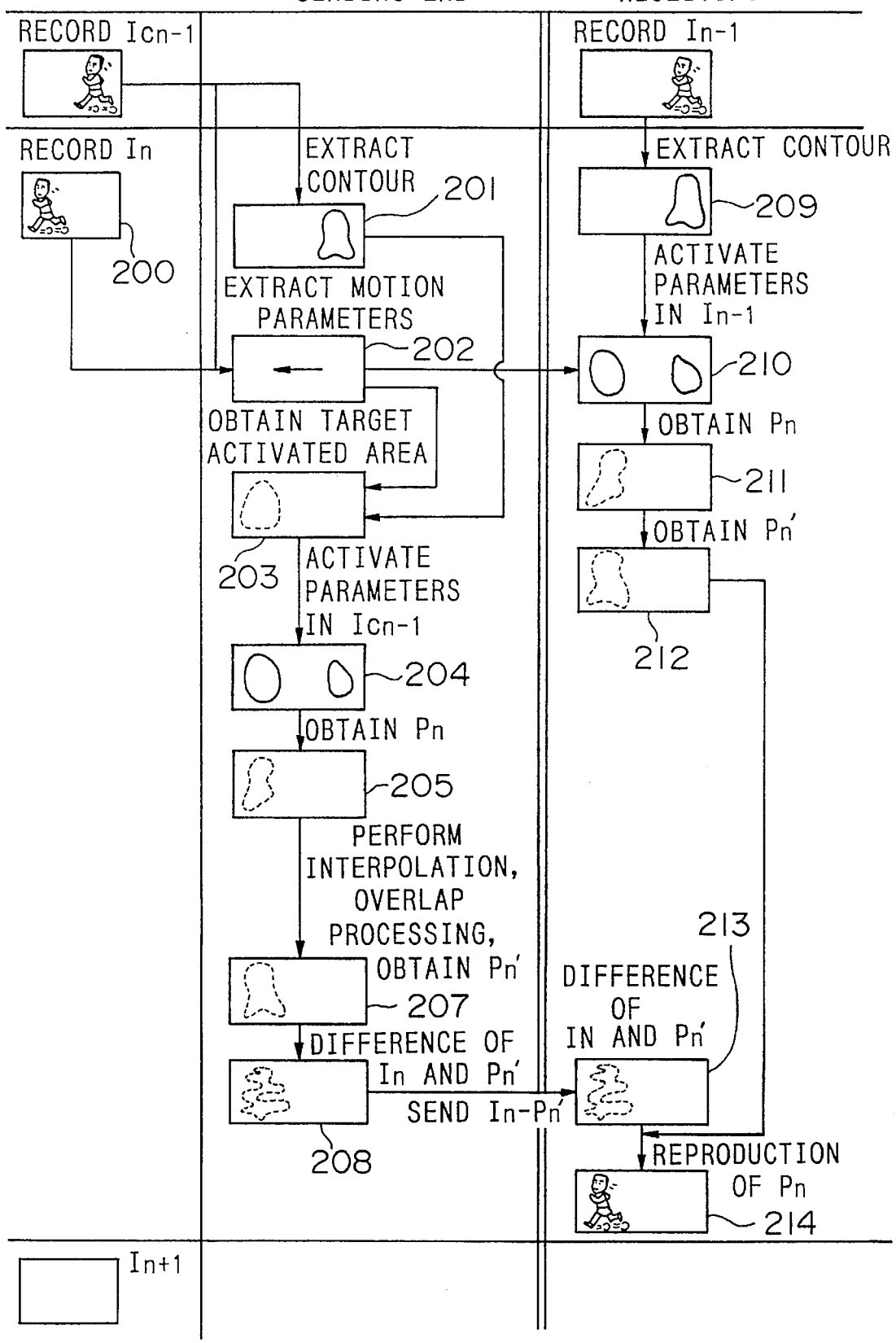
FIG. 12 is a general diagram showing encoding and decoding according to the present invention.
Figure 13:
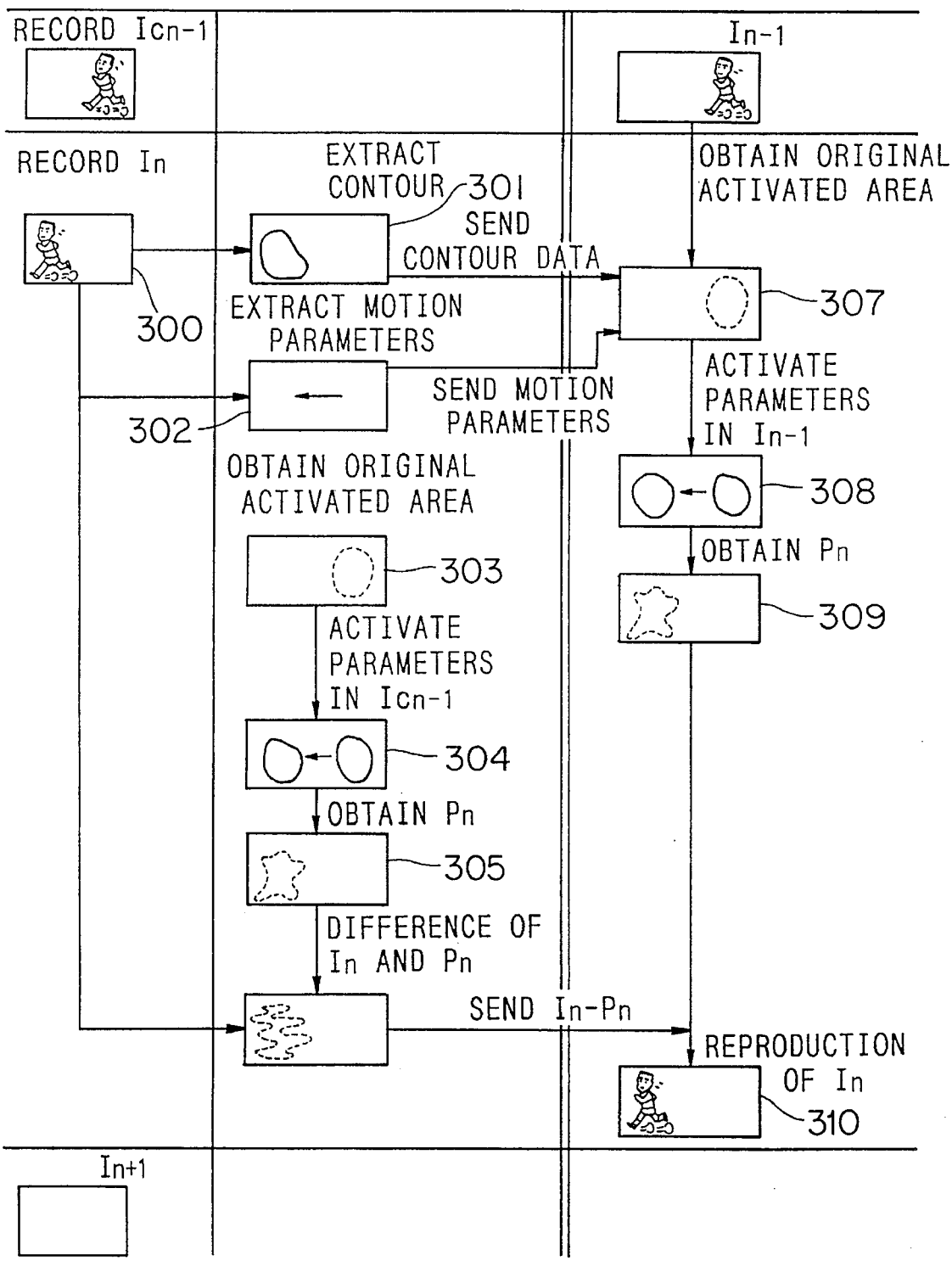
FIG. 13 is a general diagram showing encoding and decoding according to a conventional method.

FIG. 12 is a general diagram showing a visual illustration of the procedural flow based on the present invention which corresponds to the flow diagram based on the conventional method shown in FIG. 13. At the sending end, upon receipt of the image information (200) to be sent (input image $I_n$), the image is divided into segments by means of performing an edge detection process or the like, and the contour data of the segments is then sent to the sending end (201). Subsequently, at the sending end, motion parameters are extracted (202) based on the input image $I_n$ and local decoded image $Ic_{n-1}$, and then sent to the receiving end. Furthermore, at the sending end, the target activated area of motion parameters is calculated (203), the motion parameters are activated (204), and the prediction image $P_n$ is formed (205). It is possible for portions lacking a prediction value, as well as portions with overlapping prediction values to exist, thus in these cases, a corrected prediction image Pn' is formed by means of performing an interpolation operation and/or overlap processing (207). Lastly, the difference between the input image $I_n$ and corrected prediction image $P_{n'}$ is calculated and sent to the receiving end.

In the receiving end, the contour information is extracted in the same manner as in the sending end with respect to the recorded decoded image $I_{n-1}$ (209). With respect to this result, the motion parameters received are then activated, and prediction image $P_n$ is obtained (211). This prediction image $P_n$ is formed based on the same information as used in the sending set, thus this prediction image $P_n$ is identical to the prediction image $P_n$ obtained in the sending set. The input image $I_n$ is then reproduced by performing inverse quantization of the encoded information received and then adding this result with the corrected prediction image $P_{n'}$ (214).

Furthermore, the present invention is not limited to the aforementioned description contained in the embodiments, as the present invention can also be executed using various other aspects such as those mentioned in the following.

(1) With regard to the extraction of the contour information from local decoded image, various methods can be employed, as long as execution of these methods is possible in a similar manner in the receiving set.

For example, a method may be employed which uses not only the contour information incorporated into the local decoded image, but also the number of sets of motion parameters. In other words, it is possible to use a process in which if the number of sets is K, regional extraction algorithms are activated to reduce the number of regions in a restorable manner such that at the time point when the number of regions reaches K, regional division is completed. In addition, uniform portions from among past motion parameters can also be combined.

(2) Extraction of the motion parameters is not just restricted to procedures involving block matching-type motion compensation, two-dimensional affine transform, or the projection of a three-dimensional affine transform onto a two-dimensional plane, as various transforms may be used, as long as transforms such as displacement, rotation, contraction and the like can be expressed using only a few parameters.

(3) With regard to the interpolation and extrapolation performed in the post processing part for correcting the prediction image, any appropriate process may be employed, as long as it can be similarly executed by means of the receiving set.

In the same manner, processing of the overlapping areas of the prediction image may be performed using any appropriate process, as long as it can be executed by means of the receiving set, such as a selection process which utilizes a simple arithmetic mean, a weighted mean possessing an optional ratio, or the direction of the motion vector, or a weighted mean which varies the ratio by means of the direction of the motion vector.

Figure 6:
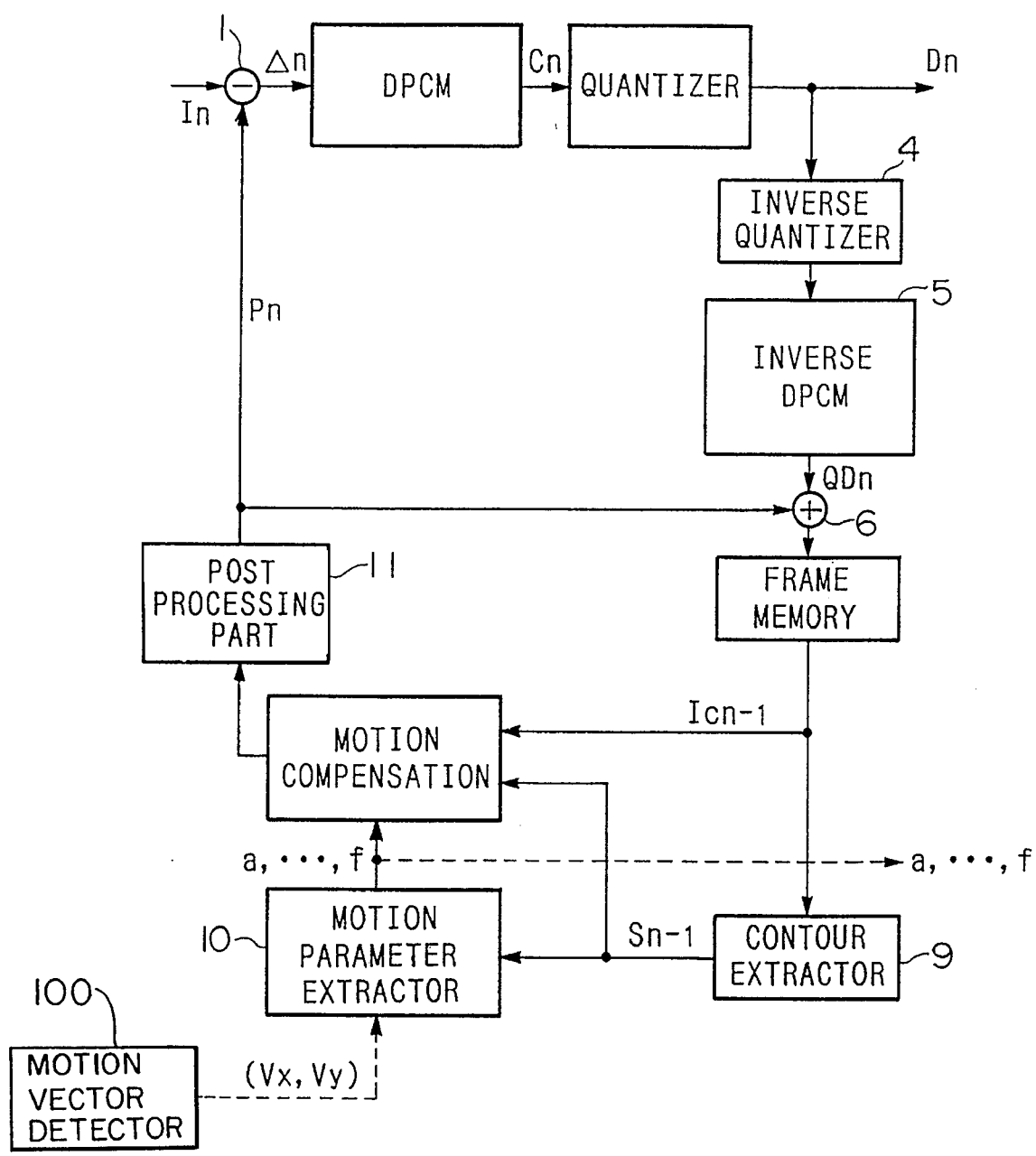
FIG. 6 is a block diagram showing another construction of a encoder for conducting a moving image transmission method according to the present invention.
Figure 7:
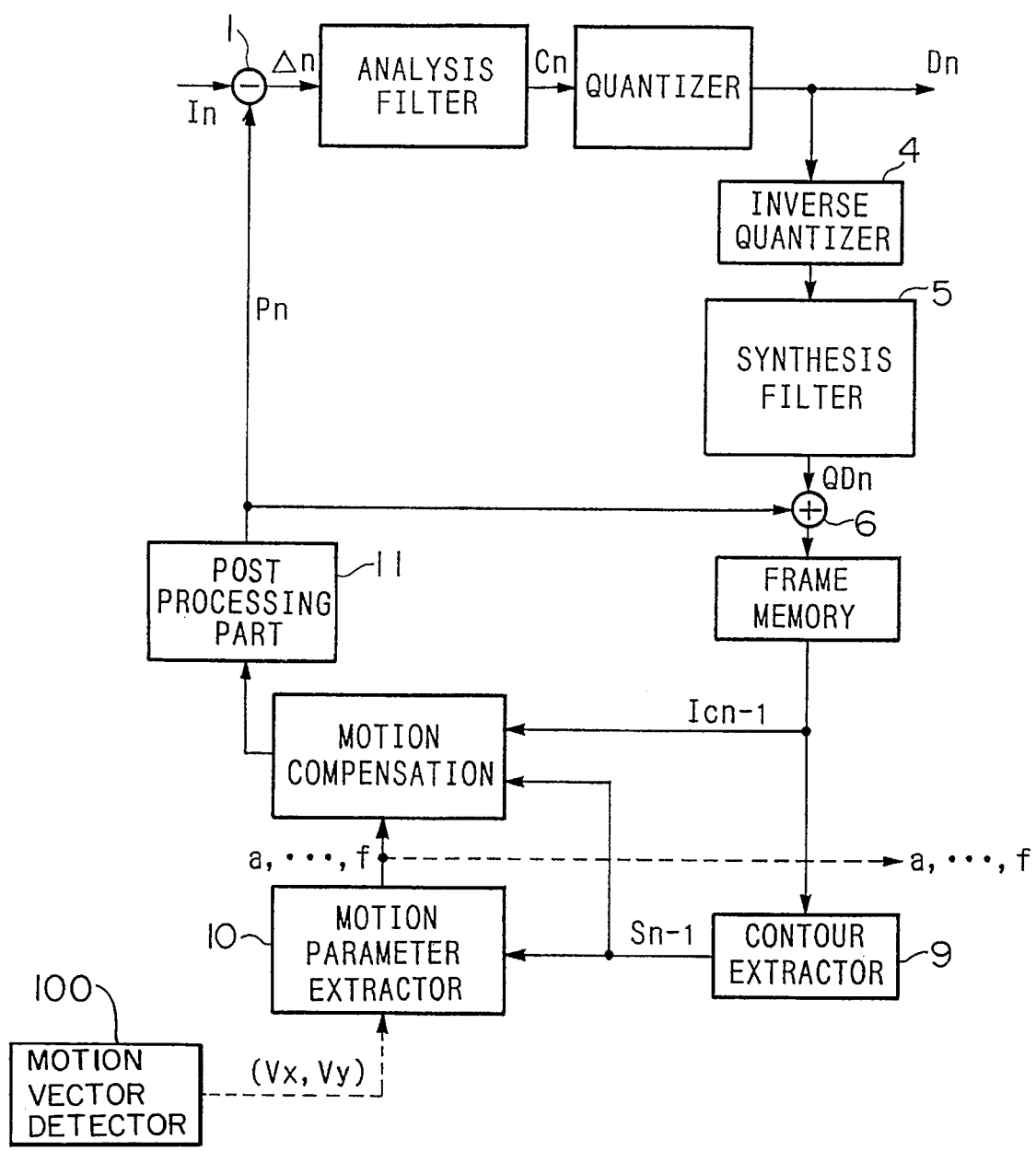
FIG. 7 is a block diagram showing another construction of a decoder for conducting a moving image transmission method according to the present invention.

(4) Encoding of the differential image is not limited to just orthogonal transform, such as discrete cosine transform and the like, and quantization, as it is also possible to employ various coding methods such as differential prediction coding, as shown in FIG. 6 (DPCM), and/or coding processes which utilize an analysis filter, as shown in FIG. 7, inverse transform, synthesis filter, and the like. In the analysis · synthesis filter, a parallel filter bank or weblet can also be used.

As explained above, according to the present invention, a high transmission efficiency can be obtained wherein encoded transmission of a segment in which motion compensation or brightness · contrast correction/adjustment is used without transmission of the contour information from the sending set to the receiving set. Furthermore, problems which can be anticipated at the time of executing the aforementioned method, such as those stemming from the occurrence of areas for which a prediction value cannot be obtained, as well as from the existence of a plurality of prediction values, can be rapidly processed by means of interpolation and overlap processing.

What is claimed is:

1. A moving image encoder comprising:

a contour extracting means for dividing a local decoded image into a plurality of segments and extracting contour information from said plurality of segments therein for each of an n number of frames, n being a natural number, in which encoding has been completed;

a motion parameter extracting means for extracting a set of motion parameters based on said contour information for each of an n number of frames in which encoding has been completed;

a motion compensation means for forming a prediction image based on said local decoded image, said contour information, and said set of motion parameters for each of an n number of frames in which encoding has been completed;

an encoding means for forming encoded information by means of quantizing a differential signal of said prediction image with a present frame;

a local decoding means for adding said prediction image to a signal formed by inverse quantization of said encoded information, forming said local decoded image from said signal, and storing said local decoded image into frame memory;

and a transmission means for transmitting said encoded information and said set of motion parameters for each of an n number of frames in which encoding has been completed;

wherein said information to be transmitted includes said encoded information and said set of motion parameters based on said contour information.

2. The moving image encoder as claimed in claim 1, wherein said encoding means is constructed such that a differential signal of a present frame and said prediction image is transformed and quantized to form encoded information; and said local decoding means is constructed such that said prediction image is added to a signal formed by inverse quantization and inverse transform of said encoded information to form a local decoded image, which is then stored in frame memory.

3. The moving image encoder as claimed in claim 1, further comprising an interpolation means for performing an interpolation operation on said prediction image when a vacant region, in which the prediction value cannot be obtained from the previous image, is generated in the present image.

4. The moving image encoder as claimed in claim 1, further comprising an overlap processing means for determining the prediction image of a overlapped region by utilizing the mean value of the prediction image or by utilizing the prediction value indicating a motion differing from the motion vector of the previous image when an overlapped region, in which the prediction valued is obtained from two or more regions of the previous image, is generated in the present image.

5. The moving image encoder as claimed in claim 1, wherein said motion compensating means is constructed such that, in addition to said motion parameters, a brightness or contrast is corrected to form a prediction image.

6. A moving image decoder comprising:

a receiving means for receiving encoded information and motion parameters for each of an n number of frames, n being a natural number, in which encoding has been completed;

a contour extracting means for dividing a decoded image into a plurality of segments and extracting contour information from said plurality of segments therein for each of an n number of frames in which encoding has been completed;

a motion compensation means for forming a prediction image based on said decoded image, said contour information, and said motion parameters for each of an n number of frames in which encoding has been completed; and a decoding means for adding said prediction image to a signal formed by inverse quantization of said encoded information, forming the decoded image from said signal, and storing said decoded image in frame memory.

7. The moving image decoder as claimed in claim 6, wherein said decoding means is constructed such that said prediction image is added to the signal formed by inverse quantization and inverse discrete cosine transform of said encoded information to form a decoded image, which is then stored in frame memory.

8. The moving image decoder as claimed in claim 6 further comprising an interpolation means for performing an interpolation operation on said prediction image when a vacant region, in which the prediction value cannot be obtained from the previous image, is generated in the present image.

9. The moving image decoder as claimed in claim 6, further comprising an overlap processing means for determining the prediction image by utilizing the mean values of the prediction image or by utilizing the prediction value indicating a motion differing from the motion vector of the previous time point, when an overlapped region, in which the prediction value is obtained from two or more regions, is generated in the present frame.

10. The moving image decoder as claimed in claim 6, wherein said motion compensation means is constructed such that, in addition to said motion parameters, a brightness or contrast is corrected to form a prediction image.

* * * * *